Figure 1:
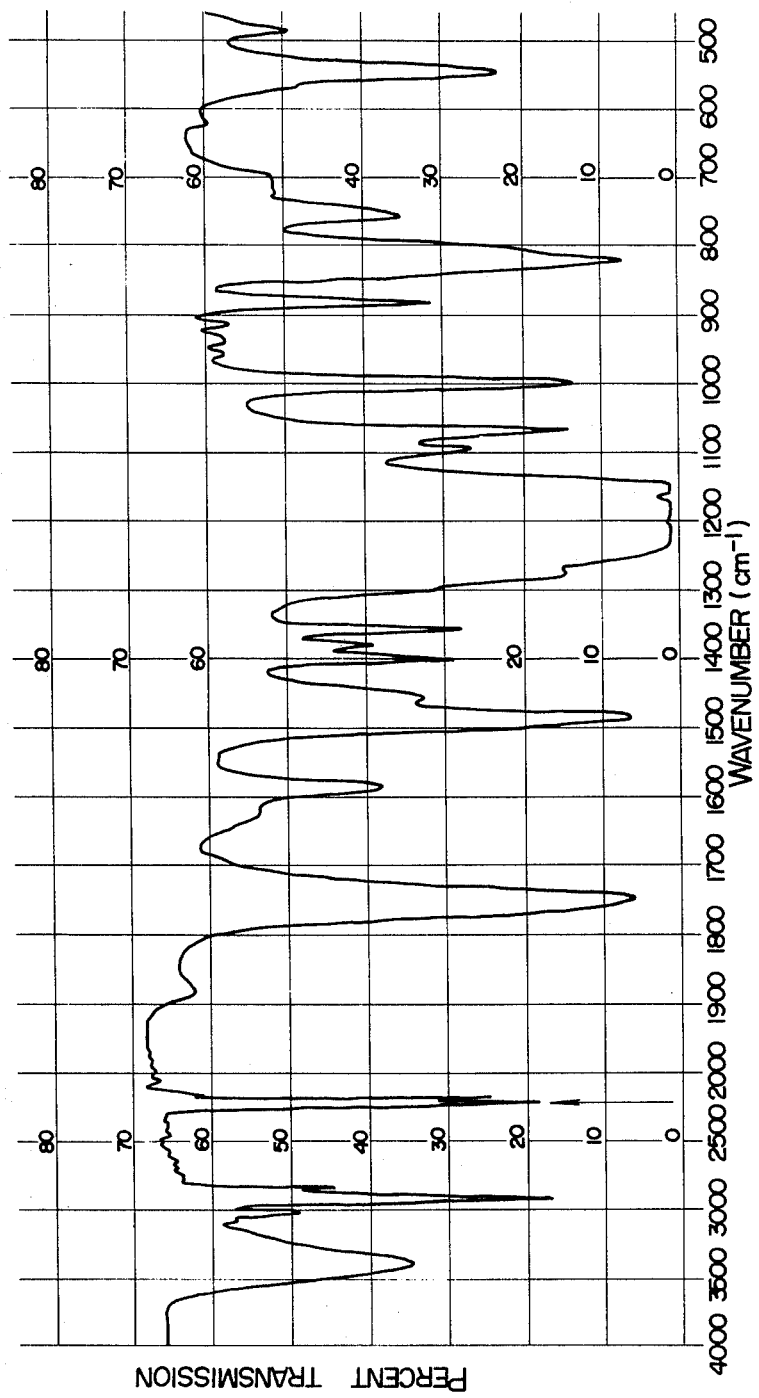

United States Patent [19]

Tanigaichi et al.

[11] 4,026,913

[45] May 31, 1977

[54] CYANIC ACID ESTERS OF AROMATIC POLYCARBONATES

[75] Inventors: Mineaki Tanigaichi; Morio Gaku; Kazuyuki Ohya, all of Tokyo; Susumu Motoori, Kashiwa; Kazuo Noguchi, Matsudo, all of Japan

[73] Assignee: Mitsubishi Gas Chemical Co., Ltd., Tokyo, Japan

[22] Filed: Mar. 25, 1976

[21] Appl. No.: 670,544

[30] Foreign Application Priority Data

Apr. 2, 1975 Japan .................................. 50-40641

[52] U.S. Cl. .................................. 260/463; 260/47 XA
[51] Int. Cl.$^2$ .................................. C07C 69/96
[58] Field of Search .................................. 260/463

[56] References Cited

UNITED STATES PATENTS 5,162,664  12/1964  Brotherton et al. .................... 260/463

*Primary Examiner*—Delbert R. Phillips
*Attorney, Agent, or Firm*—Armstrong, Nikaido & Marmelstein

[57] ABSTRACT

A novel cyanic acid ester of an aromatic polycarbonate can be prepared by reacting an aromatic polycarbonate having one or two terminal hydroxyl groups with a cyanogen halide in an inert solvent at a temperature of −30° to +65° C in the presence of a base. Said cyanic acid ester and an admixture of said cyanic acid ester with other known cyanic acid ester, both of which may or may not contain a catalyst and/or other polymers are available for a coating material, a casting material, an adhesive or a molding material. When said cyanic acid ester or said admixture is cured, there is obtained a laminate, a film or a molded article. The cured products are rich in flexibility.

19 Claims, 2 Drawing Figures

CYANIC ACID ESTERS OF AROMATIC POLYCARBONATES

The present invention relates to a novel cyanic acid ester of an aromatic polycarbonate and a process for the preparation thereof.

Resins obtained by curing known cyanic acid ester monomers are excellent in thermal and electrical properties, so that they are hopeful as laminating materials and molding materials. However, said resins are limited in use because they are so poor in flexibility that, for example, molded articles prepared therefrom are difficult to process, and coating films obtained therefrom are insufficient in performances (Kunststoffe Bd. 58 1968 Heft 12 pp. 827 – 832).

It is an object of this invention to provide a novel cyanic acid ester of an aromatic polycarbonate.

It is another object of this invention to provide a resin composition which can give a cured product which is excellent in flexibility and is easy to process.

It is a further object of this invention to provide a process for preparing a novel cyanic acid ester of an aromatic polycarbonate.

Other objects and advantages of this invention will become apparent from the following description.

According to this invention, there is provided a novel cyanic acid ester of an aromatic polycarbonate useful as a coating material, a laminate or a molding material, which is prepared by reacting an aromatic polycarbonate having one or two terminal hydroxyl groups with a cyanogen halide in an inert solvent in the presence of a base.

The aromatic polycarbonate used in this invention preferably has a number average molecular weight of less than 4,000, particularly in the range of 500 to 2,000, and has hydroxyl group at one or both terminals of its molecule. Aromatic polycarbonates having hydroxyl groups at both terminals of the molecule are preferred.

The aromatic polycarbonates used in this invention include the reaction products obtained from aromatic dihydroxy compounds by the phosgene method or the ester interchange method, which is known per se, and the products obtained by, if necessary, treating said reaction products with an acid such as phosphoric, hydrochloric or sulfuric acid to convert the terminal groups into hydroxyl groups.

Said aromatic dihydroxy compounds are represented by the general formula, $R^1(OH)_2$, wherein $R^1$ is a divalent aromatic hydrocarbon residue including, for example, the following residues:

I 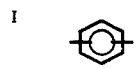

II 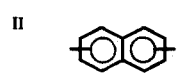

III 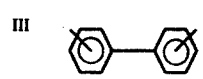

IV 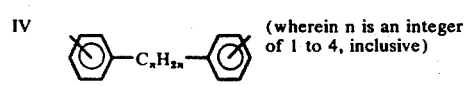 (wherein n is an integer of 1 to 4, inclusive)

V 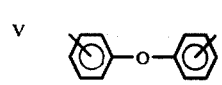

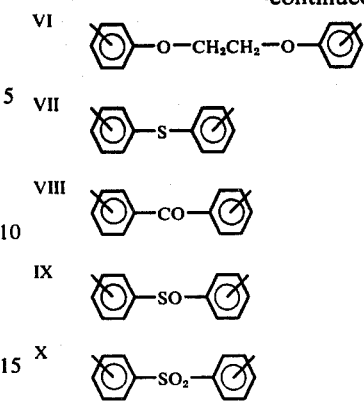

XI Residues obtained by replacing 1 to 4 hydrogen atoms on the aromatic ring of the above mentioned residues I to X with halogen atoms.

Among the above-mentioned dihydroxy aromatic compounds, particularly preferred are 2,2-bis(4-hydroxyphenyl)-propane (bisphenol A), halogenated derivatives of bis-phenol A and mixtures of two or more of them.

The cyanogen halides used in this invention include cyanogen chloride, cyanogen bromide and the like, among which cyanogen chloride is particularly preferred. Said cyanogen halide is used in an amount of at least one equivalent, preferably 1 to 2 equivalents, per equivalent of the terminal hydroxyl group of the starting polycarbonate. When it is less than one equivalent, a quantity of terminal hydroxyl group remains unreacted, which later reacts with the cyanic acid ester group of the resulting product to cause a gelation.

The bases usable in this invention include alkali metal hydroxides, alkaline earth metal hydroxides, alkali bicarbonates, alkali carbonates, alcoholates, tertiary amines and the like. Typical examples of said bases are, for instance, sodium hydroxide, potassium hydroxide, calcium hydroxide, barium hydroxide, sodium bicarbonate, sodium carbonate, potassium carbonate, lithium carbonate, sodium methylate, trimethylamine, triethylamine, tripropylamine, diethylcyclohexylamine and the like. Said bases are used in a proportion of at least 0.7 equivalent, preferably 1 to 2 equivalents, per equivalent of the hydroxyl group to be converted to a cyanic acid ester group.

Any of the solvents inert in the reaction may be used, and the solvents include hydrocarbons, chlorinated hydrocarbons, nitrated hydrocarbons, ketones, ethers and the like. Typical examples of said solvents are benzene, toluene, xylene, chloroform, methylene chloride, carbon tetrachloride, chlorobenzene, nitrobenzene, nitromethane, acetone, methyl ethyl ketone, methyl isobutyl ketone, diethyl ether, tetrahydrofuran, dioxane and the like.

In the reaction of this invention, the starting materials may be added to the reaction system in any order so far as the quantity of the base present in the reaction system is always kept stoichiometrically deficient to the quantity of cyanogen halide present there (namely, the equivalent ratio of the base to the cyanogen halide is less than 1). Generally, however, the reaction is effected by dissolving the aromatic polycarbonate and the cyanogen halide in the solvent and dropping the base into the resulting solution with thorough stirring.

The reaction temperature is −30° to +65° C, preferably 0° to 20° C. When the temperature is lower than −30° C the polycarbonate is difficult to dissolve. When the temperature exceeds 65° C the control of velocity of reaction becomes quite difficult. After the salt formed by the reaction has been removed, the liquid reaction mixture is distilled under reduced pressure to eliminate the solvent or it is dropped into a poor solvent for the cyanic acid ester, whereby the cyanic acid ester of aromatic polycarbonate of this invention can be separated in the form of a solid.

The cyanic acid ester obtained according to this invention can alone be cured to form laminates, films, etc. The cyanic acid ester obtained according to this invention can be formed into a resin composition by blending the cyanic acid ester with at least one member selected from the group consisting of other known cyanic esters, a catalyst and other polymers. The resin composition thus obtained can be used as a coating material, a casting material, an adhesive, a molding material or the like. Laminates, films, etc. can be produced by curing the resin composition.

It has hitherto been known to produce, in general, a polytriazine type of cured resin by heating a cyanic acid ester alone or in admixture with a metal chloride such as $AlCl_3$, $SnCl_4$, $ZnCl_2$, $TiCl_3$ or the like; an amine such as triethylenediamine, dimethylbenzylamine or the like; an aromatic hydroxy compound such as phenol, catechol or the like; a metal salt of an organic acid such as zinc octoate

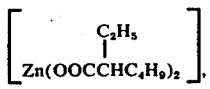

titanium butyrate or the like; or a powdered metal such as powdered iron. It has also been known to produce prepolymers by preheating said cyanic acid esters, as well as to put the resulting prepolymers in various uses such as prepreg, molding compound, etc. It has also been known to react said cyanic acid ester or the prepolymer with a compound having two or more epoxy groups per one molecule, to react the same with a primary or secondary amine, or to react the same with a polyhydroxy aliphatic or polyhydroxy aromatic compound. It has further been known to thermally cure the resin obtained by uniformly mixing said cyanic acid ester with polyamide-imide and/or polyimide.

All the known curing and molding procedures are applicable to the process for curing or molding the cyanic acid ester of aromatic polycarbonate of this invention. It is also possible to use a mixture of the cyanic acid ester of aromatic polycarbonate of this invention with other known cyanic acid esters in any proportion.

Examples of said other known cyanic acid esters are as follows:

1. 4,4′-Dicyanatobiphenyl

NCO—⌬—⌬—OCN

2. Bis(4-cyanatophenyl)methane

NCO—⌬—CH₂—⌬—OCN 3. 1,1-Bis(4-cyanatophenyl)ethane

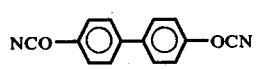

4. 2,2-Bis(4-cyanatophenyl)-propane

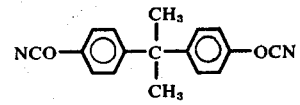

5. Bis(4-cyanatophenyl)ether

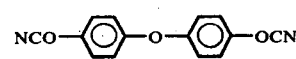

6. Bis(4-cyanatophenyl)sulfone

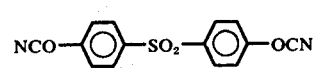

7. Novolac type phenolic resins containing cyanic acid ester groups

The cured resin prepared from a mixture of the cyanic acid ester of aromatic polycarbonate of this invention and other usual cyanic acid esters is lower in dielectric constant and higher in flexibility, than the cured resins prepared from the usual cyanic acid esters only which are generally considered to have a low dielectric constant. As will be stated in the Comparative Example which appears hereinafter, for instance, if a mixture of the cyanic acid ester of aromatic polycarbonate of this invention and 2,2-bis(4-cyantophenyl)-propane obtained from bisphenol A is cured, the cured resin obtained has a sufficiently high flexibility despite of the small inferiority in heat resistance, and it is suitable as a coating material.

Figure 2:
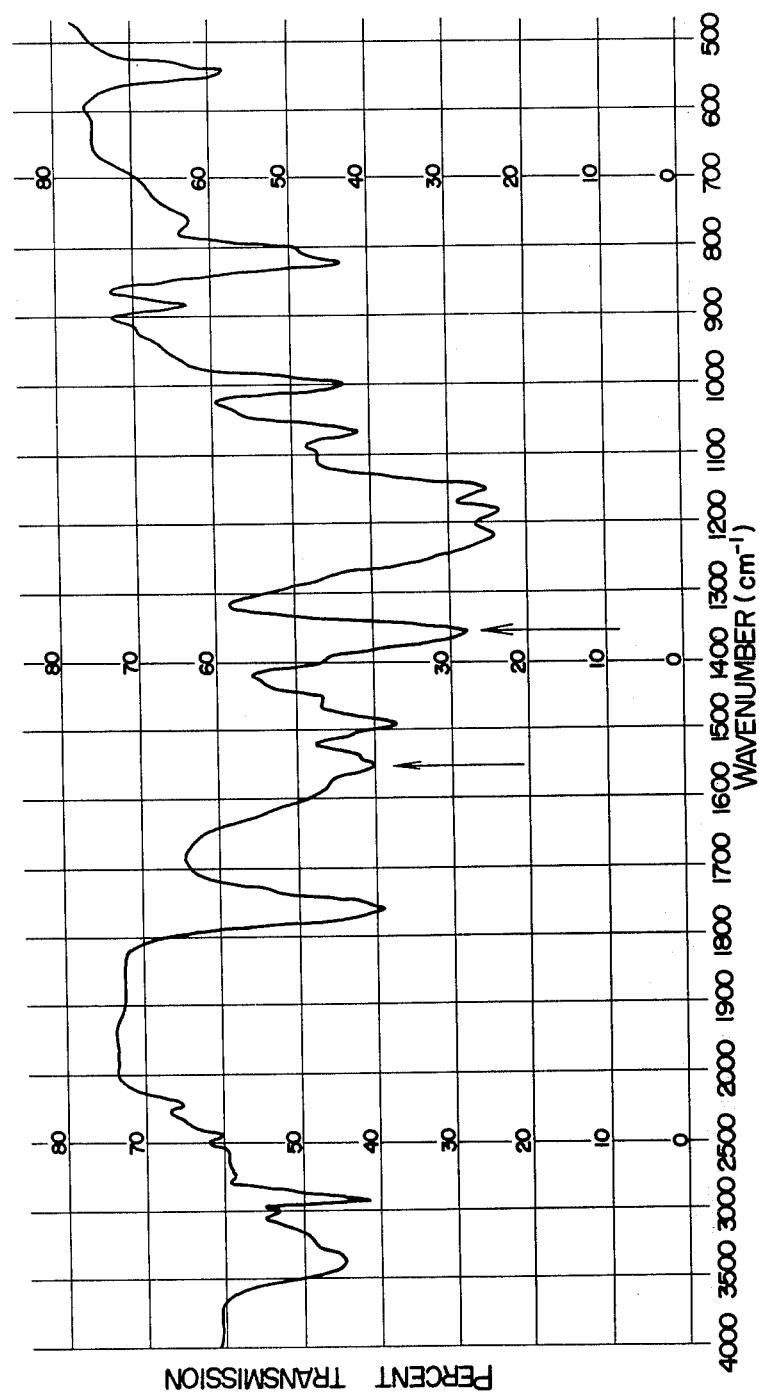

In the accompanying drawings,

FIG. 1 shows an infrared absorption spectrum of one of the present cyanic acid esters and FIG. 2 shows an infrared absorption spectrum of the cured product of the cyanic ester of FIG. 1.

The following Examples illustrate the production process of this invention, and the production of copper-clad laminate and performances thereof for demonstrating the usefulness of the cyanic acid ester of this invention. The Examples are only by way of illustration and not by way of limitation.

EXAMPLE 1

In 300 cc of acetone were dissolved 23 g of cyanogen bromide and 72 g of a polycarbonate which had been prepared from 2,2-bis(4-hydroxyphenyl)propane (hereinafter referred to as bisphenol A) by the ester interchange method and had a number average molecular weight of 659, a terminal hydroxyl group concentration of 4.73% by weight (it nearly corresponds to 1.8 hydroxyl groups per one molecule on the average) and a melting point of 71° − 78° C, and the resulting solution was ice-cooled. While the solution was stirred uniformly, 21 g of triethylamine was dropped into the solution over a period of 120 minutes, during which the reaction temperature was kept at 5° − 10° C. After the resulting crystalline by-product was removed by filtration, the acetone was eliminated from the filtrate, upon which a solid cyanic acid ester was obtained. The infrared absorption spectrum of the cyanic acid ester thus obtained is as shown in FIG. 1, wherein there is observed a characteristic absorption band of cyanic acid ester group at a wave number of 2250 cm⁻¹ in addition to the usual characteristic absorption bands of polycarbonate. The cyanic acid ester had a melting point of 99° − 111° C and gelled on a hot plate kept at 160° C in 9 minutes and 43 seconds. The cyanic acid ester was subjected to the following curing test to obtain the results mentioned below.

The cyanic acid ester was molded and cured at 200° C for 30 minutes, after which it was heat-treated at 130° C for 2 hours to give an insoluble and infusible cured resin. The latter had high mechanical strengths and had a glass transistion temperature of 100° C as estimated by the measurement of dynamic visco-elasticity. The infrared absorption spectrum of the cured resin is as shown in FIG. 2, wherein the characteristic absorption band of cyanic acid ester group at 2250 $cm^{-1}$ disappears and there are observed the characteristic absorption bands of triazine ring at 1360 $cm^{-1}$ and 1560 $cm^{-1}$.

EXAMPLE 2

In 300 cc of methylene chloride were dissolved 12 g of cyanogen bromide and 93 g of a polycarbonate which had been prepared from bisphenol A by the phosgene method and had a number average molecular weight of 1,550, a terminal hydroxyl group concentration of 1.83% by weight (it nearly corresponds to 1.7 hydroxyl groups per one molecule on the average) and a melting point of 100° – 109° C. The resulting solution ice-cooled with thorough stirring, into which was dropped 16 g of tripropylamine over a period of 120 minutes, while maintaining the reaction temperature at 5° – 10° C. After the reaction, the resulting crystalline by-product was removed by filtration and the filtrate thus obtained was dropped into methanol in an amount 20 times the volume of the filtrate with stirring, whereby a cyanic acid ester of the polycarbonate was obtained in the white powdery form. In the infrared absorption spectrum of the cyanic acid ester, there was observed a characteristic absorption band of cyanic acid ester group at a wave number of 2250 $cm^{-1}$. The cyanic acid ester had a melting point of 143° – 154° C and gelled on a hot plate kept at 180° C in 15 minutes. The cyanic acid ester was subjected to the same curing test as in Example 1. The results of the test were the same as in Example 1, except that the glass transition point was 120° C.

EXAMPLE 3

In 300 cc of methylene chloride were dissolved 7 g of cyanogen choride and 82 g of a brominated polycarbonate which had been prepared from 2,2-bis(3,5-dibromo-4-hydroxyphenyl)propane by the ester interchange method and had a number average molecular weight of 1,480, a terminal hydroxyl group concentration of 2.07% by weight (it nearly corresponds to 1.8 hydroxyl groups per one molecule on the average) and a melting point of 92° – 100° C. The resulting solution was ice-cooled with thorough stirring, into which was dropped 11 g of triethylamine over a period of 120 minutes, while maintaining the reaction temperature at 2° – 6° C. After the reaction, the resulting crystalline by-product was removed by filtration and the filtrate thus obtained was dropped into methanol in an amount 20 times the volume of the filtrate with stirring, whereby a cyanic acid ester of the brominated polycarbonate was obtained in the powdery form. In the infrared absorption spectrum of the cyanic acid ester, there was observed a characteristic absorption band of cyanic acid ester group at 2250 $cm^{-1}$. The cyanic acid ester had a melting point of 112° – 121° C and gelled on a hot plate kept at 160° C in 10 minutes and 30 seconds. It was subjected to the same curing test as in Example 1. The results of the test were the sane as in Example 1, except that the glass transition point was 131° C.

EXAMPLE 4

In 300 cc of dioxane were dissolved 14 g of cyanogen bromide and 106 g of a polycarbonate which had been prepared from bisphenol A by the phosgene method and had a number average molecular weight of 2,100, a terminal hydroxyl group concentration of 1.28% by weight (it nearly corresponds to 1.6 hydroxyl groups per one molecule on the average) and a melting point of 114° – 124° C. While the resulting solution was ice-cooled with thorough stirring, 7 g of powdered potassium hydroxide was slowly added thereto over a period of 30 minutes, during which the reaction temperature was kept at 15° – 20° C. After the reaction, the liquid reaction mixture was dropped into methanol in an amount 20 times the volume of the reaction mixture with stirring, whereby a cyanic acid ester of the polycarbonate was obtained in the white powdery form. In the infrared absorption spectrum of the cyanic acid ester, there was observed a characteristic absorption band of cyanic acid ester group at a wave number of 2250 $cm^{-1}$. The cyanic acid ester had a melting point of 155° – 164° C and gelled on a hot plate kept at 180° C in 60 minutes and 20 seconds.

The cyanic acid ester thus obtained was subjected to the same curing test as in Example 1, except that the heat treatment time was 6 hours. The results of the test were the same as in Example 1, except that the glass transition point was 126° C.

EXAMPLE 5

In 300 cc of chlorobenzene were dissolved 8 g of cyanogen bromide and 91 g of a polycarbonate which had been prepared from bisphenol A by the phosgene method and had a number average molcular weight of 3,500, a terminal hydroxyl group concentration of 0.75% by weight (it nearly corresponds to 1.5 hydroxyl groups per one molecule on the average) and a melting point of 134° – 145° C. While the resulting solution was ice-cooled with thorough stirring, 7 g of triethylamine was dropped thereinto over a period of 60 minutes, during which the reaction temperature was kept at 15° – 20° C. After the reaction, the liquid reaction mixture was dropped into methanol in an amount 20 times the volume of the reaction mixture with stirring, whereby a cyanic acid ester of the polycarbonate was obtained in the white powdery form. In the infrared absorption spectrum of the cyanic acid ester, there was observed a characteristic absorption band of cyanic acid ester group at a wave number of 2250 $cm^{-1}$. The cyanic acid ester had a melting point of 172° – 183° C and gelled on a hot plate kept at 200° C in 79 minutes and 40 seconds.

The cyanic acid ester thus obtained was subjected to the same curing test as in Example 1, except that the molding-curing time and the heat treatment time were 3 hours and 6 hours, respectively. The results of the test were the same as in Example 1, except that the glass transition point was 122° C.

EXAMPLE 6

A prepolymer of a cyanic acid ester was prepared by dissolving 10 parts by weight of the cyanic acid ester of polycarbonate obtained in Example 1, 90 parts by weight of 2,2-bis(4-cyanatophenyl)propane and 0.01 part by weight of 2-ethyl-4-methylimidazole in methyl ethyl ketone and heating the resulting solution at 80° C for 15 hours with stirring.

Subsequently, a semi-cured prepreg was prepared by mixing 100 parts by weight (as solids) of said prepolymer with 0.20 part by weight of zinc octoate (zinc content 8%), 0.10 part by weight of catechol and 0.10 part by weight of 2-ethyl-4-methylimidazole, followed by impregnating a glass non-woven fabric with the resulting liquid mixture and then drying it at an elevated temperature. A copper-clad laminate was prepared by laminating a copper foil and five sheets of the prepreg together at 190° C for 2 hours under a pressure of 30 kg/cm². The characteristic properties of the thus obtained laminate are shown in the table which appears hereinafter.

EXAMPLE 7

A prepolymer of a cyanic acid ester was prepared by dissolving 35 parts by weight of the cyanic acid ester of polycarbonate obtained in Example 1, 65 parts by weight of 2,2-bis(4-cyanatophenyl)propane and 0.01 part by weight of 2-ethyl-4-methylimidazole into methyl ethyl ketone and heating the resulting solution at 50° C for 12 hours with stirring. Under the same conditions as in Example 6, a prepreg was prepared from the prepolymer, and then a copper-clad laminate was produced from the prepreg. The characteristic properties of the copper-clad laminate thus obtained are shown in the table which appears hereinafter.

COMPARATIVE EXAMPLE

In order to make a comparison with the results of Examples 6 and 7, a copper-clad laminate was prepared by repeating the procedure of Example 6, except that only 2,2-bis(4-cyanatophenyl)propane was used as the starting material, and the weight ratio of the cyanic acid ester to the 2-ethyl-4-methylimidazole was 100 : 0.01 at the starting stage. The characteristic properties of the copper-clad laminate thus obtained are shown in the table, which appears hereinafter.

Table

| Characteristic Properties of Laminates | | | |
| --- | --- | --- | --- |
|  | Example 6 | Example 7 | Comparative Example |
| Flexural strength (kg/mm²) (ASTM D 790) | 32 | 29 | 34 |
| Flexural modulus kg/mm²) (ASTM D 790) | 1,310 | 1,080 | 1,450 |
| Dielectric constant (1 MHz) (JIS C 6481) | 3.5 | 3.3 | 3.7 |
| Glass transition point (° C) (Measurement of dynamic viscoelasticity at 11 Hz) | 230 | 180 | Above 250 |
| Punching quality (ASTM D 617) | Good | Excellent | Fair |

Note:
Excellency in flexibility is demonstrated by an excellent punching quality and a low flexural modulus.

What is claimed is:

1. A cyanic acid ester of an aromatic polycarbonate obtained by reacting an aromatic polycarbonate having one or two terminal hydroxyl groups and prepared from an aromatic dihydroxy compound represented by one of the formulas I to X:

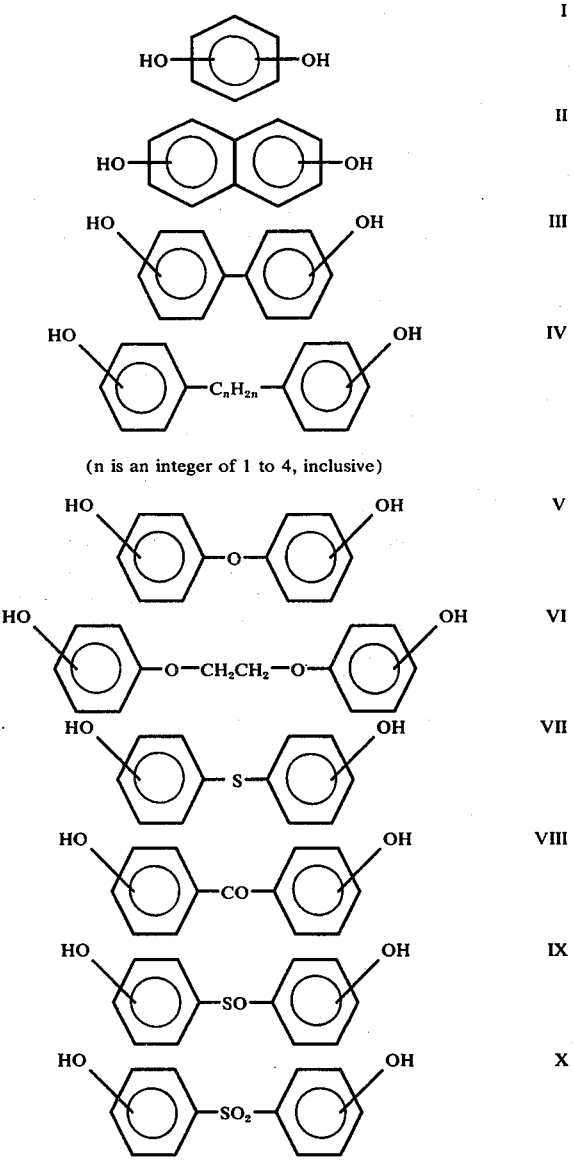

(n is an integer of 1 to 4, inclusive)

or a mono-, di-, tri- or tetra-halogeno-nuclear substituted derivative of an aromatic dihydroxy compound represented by one of the formulas I to X, through the phosgene method or the ester interchange method, with a cyanogen halide in the presence of a base in an inert solvent.

2. A cyanic acid ester according to claim 1, wherein the aromatic polycarbonate has two terminal hydroxyl groups.

3. A cyanic acid ester according to claim 1, wherein the aromatic polycarbonate has a number average molecular weight of less than 4,000.

4. A cyanic acid ester according to claim 1, wherein the aromatic polycarbonate has a number average molecular weight of 500 to 2,000.

5. A cyanic acid ester according to claim 1, wherein the aromatic dihydroxy compond is one represented by the formula

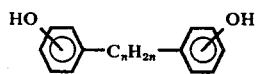

or a mono-, di-, tri- or tetra-halogeno-nuclear substituted derivative thereof.

6. A cyanic acid ester according to claim 1, wherein the aromatic dihydroxy compound is 2,2-bis(4-hydroxyphenyl)propane.

7. A cyanic acid ester according to claim 1, wherein the aromatic dihydroxy compound is 2,2-bis(3,5-dibromo-4-hydroxylphenyl)propane.

8. A cyanic acid ester according to claim 6, wherein the aromatic polycarbonate has a number average molecular weight of 659 and 1.8 terminal hydroxyl groups and is reacted with cyanogen bromide.

9. A cyanic acid ester according to claim 7, wherein the aromatic polycarbonate has a number average molecular weight of 1,480 and 1.8 terminal hydroxyl groups and is reacted with cyanogen chloride.

10. A cyanic acid ester according to claim 6, wherein the aromatic polycarbonate has a number average molecular weight of 1,550 and 1.7 terminal hydroxyl groups and is reacted with cyanogen bromide.

11. A cyanic acid ester according to claim 6, wherein the aromatic polycarbonate has a number average molecular weight of 2,100 and 1.6 terminal hydroxyl groups and is reacted with cyanogen bromide.

12. A cyanic acid ester according to claim 6, wherein the aromatic polycarbonate has a number average molecular weight of 3,500 and 1.5 terminal hydroxyl groups and is reacted with cyanogen bromide.

13. A cyanic acid ester according to claim 1, wherein the cyanogen halide is used in a proportion of at least one equivalent per equivalent of the terminal hydroxyl group of the aromatic polycarbonate.

14. A cyanic acid ester according to claim 1, wherein the cyanogen halide is cyanogen chloride or bromide.

15. A cyanic acid ester according to claim 1, wherein the reaction is effected at a temperature of $-30°$ to $65°$ C.

16. A cyanic acid ester according to claim 1, wherein the base is an alkali metal hydroxide, an alkaline earth metal hydroxide, an alkali metal bicarbonate, an alkali metal carbonate, an alcoholate or a tertiary amine.

17. A cyanic acid ester according to claim 1, wherein the base is used in a proportion of at least 0.7 equivalent per equivalent of the terminal hydroxyl group of the aromatic polycarbonate.

18. A cyanic acid ester according to claim 1, wherein the inert solvent is a hydrocarbon, a halogenated hydrocarbon, a nitrated hydrocarbon, a ketone or an ether.

19. A cyanic acid ester according to claim 1, wherein the equivalent ratio of the base to the cyanogen halide is less than 1.

* * * * *

UNITED STATES PATENT OFFICE
CERTIFICATE OF CORRECTION

Patent No. 4,026,913　　　　　　　Dated　May 31, 1977

Inventor(s)　　　MINEAKI TANIGAICHI ET AL

It is certified that error appears in the above-identified patent and that said Letters Patent are hereby corrected as shown below:

Please amend the Assignee to read:

--MITSUBISHI GAS CHEMICAL COMPANY, INC.

TOKYO, JAPAN --.

*Signed and Sealed this*

*Fifteenth* Day of *November 1977*

[SEAL]

*Attest:*

RUTH C. MASON　　　　　　LUTRELLE F. PARKER
*Attesting Officer*　　　*Acting Commissioner of Patents and Trademark*